May 9, 1933. E. D. BARRINGER 1,908,623
THRESHOLD
Filed Feb. 1, 1932 2 Sheets-Sheet 2
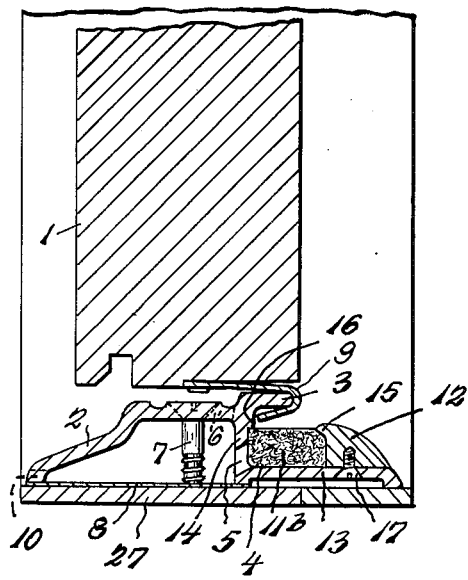
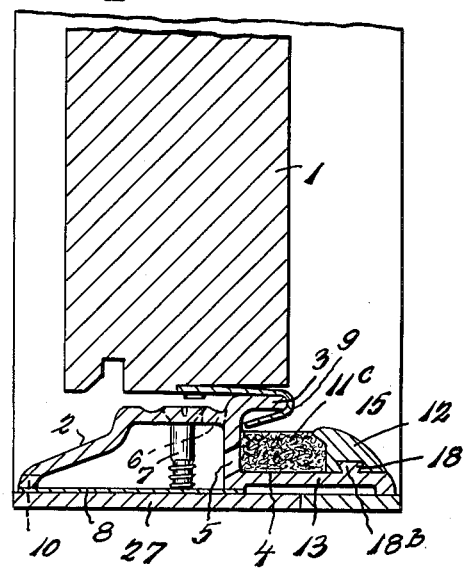
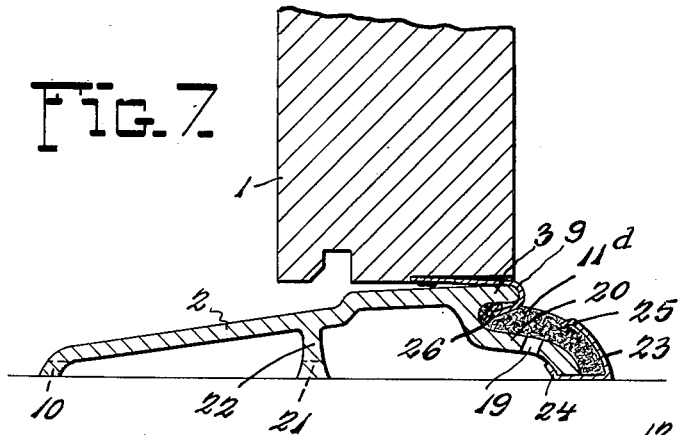
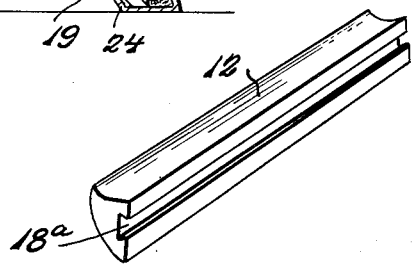
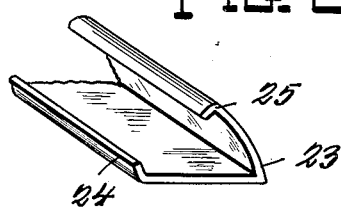
Inventor
ELMER D. BARRINGER
By
Attorneys Patented May 9, 1933

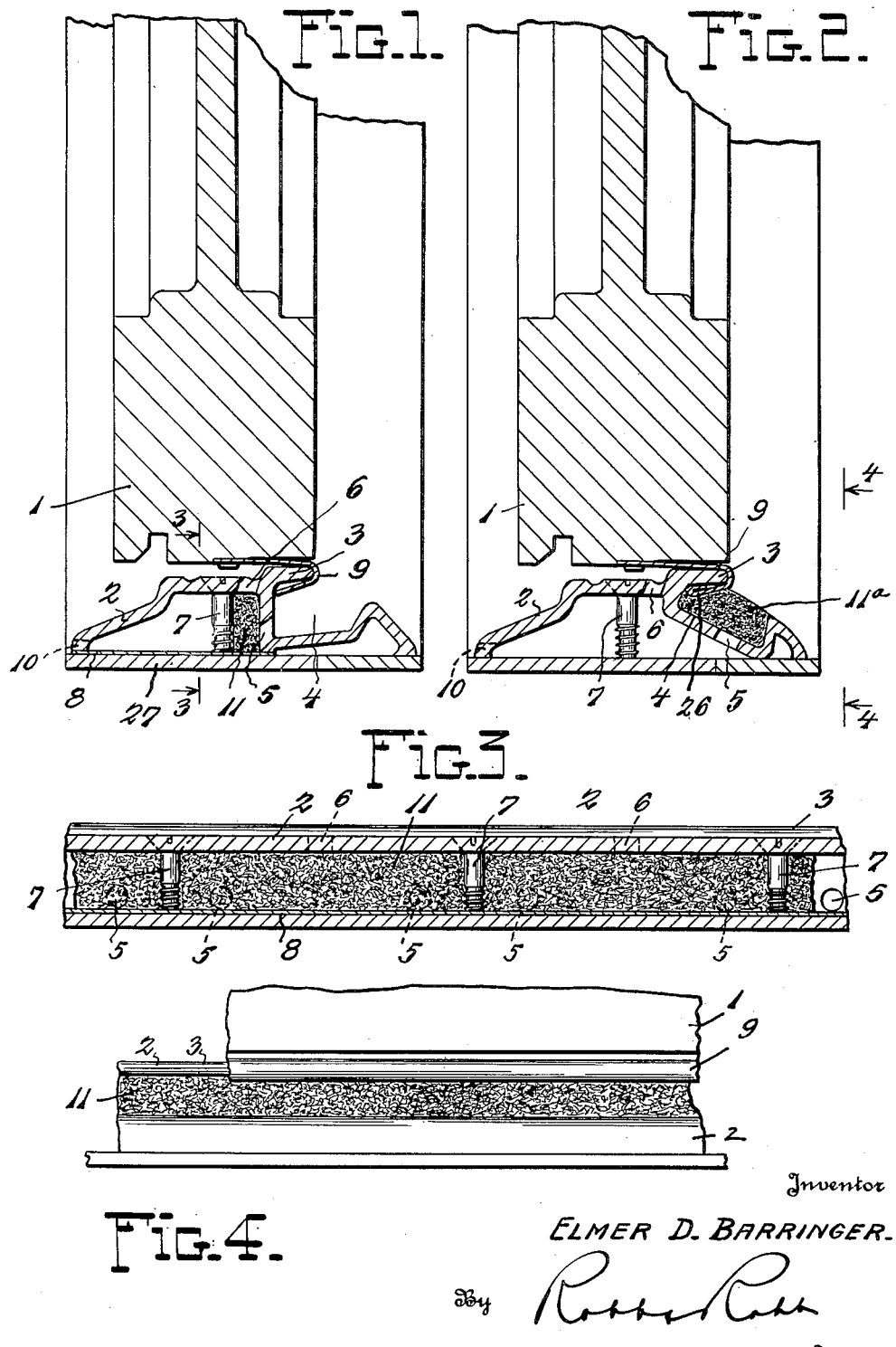

1,908,623

UNITED STATES PATENT OFFICE

ELMER D. BARRINGER, OF CLEVELAND, OHIO

THRESHOLD

Application filed February 1, 1932. Serial No. 590,284.

This invention incorporates certain improved features in the forms of weatherstrips widely employed, particularly to forms employed under doors as thresholds, which thresholds are designed to protect the interior of a room or building from admission of outside weather conditions.

Many forms of such thresholds have been devised, one standard form comprising a body having opposite downwardly sloping sides and a middle elevated tread having an edge portion extending laterally toward one of the sides, the side adjacent to the edge portion having an outer surface sloping toward the edge portion and then extending downwardly to form an open gap, the side being vertically disposed under the tread to provide a support backward from the edge portion.

In thresholds of this general character, the space between the threshold and the door under which the threshold is installed is closed by a resilient sealing strip which is meant to engage and enclose the edge portion of the tread. This strip is for the purpose of collecting the bulk of rain or other forms of precipitation which might otherwise be driven into the room or building by wind passing between the door and the threshold; and it also serves as a seal against the passage of such wind and the consequent creation of hurtful drafts. Notwithstanding the use of this resilient sealing strip, however, under high wind velocity and severe wind precipitation there is a possibility of seepage of moisture between the door and the threshold, and it is for the collection of such moisture that the form of threshold above referred to has the open gap, which is positioned on the interior side of the door.

It becomes necessary to assure drainage of such water collected in the gap, and for this purpose a series of weepholes are provided which lead the collected water from the gap or trough beneath the threshold; and the installation of the threshold is such that the water so led from the gap of the trough is permitted to escape from beneath the threshold through the provision of weepholes extending through the outer wall of the threshold to the outside thereof.

It will be seen, therefore, that even though the weepholes are not oppositely disposed, under severe weather conditions there is a possibility of wind coming from the outer doors through the weepholes to the interior of the room or building, thus setting up objectionable draft; and if there is a heavy precipitation accompanied by sufficient wind velocity, the precipitation will be driven into the inside of the room or building through these weepholes.

The present invention has for one of its objects the provision of an improved construction which will completely stop all passage of wind and the like under all weather conditions, thereby completely protecting the interior of a building from outside weather conditions irrespective of the severity thereof.

A further object of the invention lies in the provision of means secured to the threshold for completely blocking admission of snow, rain, or wind through the threshold, while at the same time permitting ready drainage of water which may collect over the threshold to the interior thereof.

The invention will be more readily understood from a consideration of the accompanying drawings, in which Figure 1 represents a sectional view through the door equipped with an improved threshold embracing the features of this invention.

Figure 2 is a similar view of a modified form.

Figure 3 is a fragmentary sectional view along the line 3—3 of Figure 2, looking in the direction of the arrows.

Figure 4 is a fragmentary rear elevation of the construction shown in Figure 2, the view being taken along the line 4—4 of Figure 2, looking in the direction of the arrows.

Figures 5, 6, and 7 are sectional views similar to Figures 1 and 2 but showing various modified forms of the construction.

Figure 8 is a fragmentary perspective view of a clamping device employed in the construction of Figure 7.

Figure 9 is a perspective view of a reinforcing member employed in the construction illustrated in Figure 6.

Referring more particularly to the drawings, the numeral 1 represents a door which is provided with a metal threshold 2, which is illustrated as being of a one-piece construction, having the upstanding inwardly projecting ledge 3 and a trough 4 for collecting any moisture which may be driven over the threshold into the interior thereof.

To permit complete drainage of such moisture, weepholes 5 are provided, there being other weepholes 6 extending through the top of the threshold and located just in front of the ledge 3.

The threshold is suitably secured in position by screws 7, or equivalent securing means.

As installed, the threshold 2 rests upon a metal floor piece 8, there being an auxiliary or sealing strip 9 secured to the door and bent in a configuration so that it will slip over the rear edge of the ledge 3 and seal the space between the ledge 3 and the door 1. It will therefore be seen that very little moisture will be driven through the door, the bulk of it being stopped by the ledge 3 and carried off through the weepholes 6 before it reaches the trough 4; but any water which may seep over and collect in the trough 4 is drained outwardly through the weepholes 5, thence escaping from beneath the threshold through weepholes 10 located at the front edge of the threshold 2. It will be seen that under severe weather conditions, even though the weepholes 5 and 10 be not oppositely disposed, there may be a tendency for rain or snow to be driven through the threshold into the interior of the room, or wind may enter through these weepholes when blowing under a sufficient high velocity, creating a disagreeable or harmful draft. To prevent such objectionable possibilities the present invention provides a means for blocking such ingress of atmospheric conditions, while at the same time not hindering in any way the drainage of collected water in the manner already referred to. The means employed in accordance with this invention is specifically a strip of felt secured to the threshold and positioned over the weepholes communicating with the interior trough. This felt is of necessity of a kind which will freely absorb moisture and which will freely allow the passage of moisture therethrough for drainage purposes. For this reason not all kinds of felt will be suitable for the purpose, since obviously there must be free absorption and free drainage in order to enable the threshold to efficiently function as a protective medium.

In the form shown in Figure 1 the felt is indicated at 11 and is cemented to the rear wall of the threshold, being also held in place by engagement of the screws 7 therewith. It will be seen that this layer 11 of felt completely covers the weepholes 5 and effectively bars admission of any outside atmospheric conditions, while serving as a filter to permit free drainage of collected moisture, preventing any accumulation of dirt from passing under the threshold, which would ultimately clog the weepholes 10. The layer of felt is compressed between the threshold and the floor.

In Figure 2, there is a somewhat modified form of threshold illustrated, and the felt 11a is shown as being positioned so as to fill the inside trough. This strip 11a is held in position by the overhanging ledge 3, and this form of installation has the advantage in that any possibility of stumbling over the threshold is avoided as it is not possible for a shoe to catch underneath the ledge 3 of the threshold. Because of the freely absorbent and drainage properties of the felt 11a, any moisture driven over the ledge 3 is drained freely through the weep holes 5 and thence out through weepholes 10 as previously described.

In Figure 5 the interior trough is formed by an auxiliary strip 12 being secured to the interior of the threshold which has been extended as at 13 to form a flat inwardly extending projection, the trough being formed between the auxiliary strip 12 and the upstanding wall 14 of the threshold. Weepholes 5 are again provided to drain moisture, and the layer of felt 11b is held in position through engagement with the shoulders 15 and 16 formed in the auxiliary strip 12 and vertical wall 14 respectively. The strip 12 is held in position by screws 17 or equivalent fastening devices.

The construction of Figure 6 is similar to that of Figure 5, except that the strip 12 is joined to the extension 13 by a dovetail joint 18. The felt strip 11c is similar to 11b and held in place in similar manner. It will be noted that the strip 12 is slightly elevated at the shoulder 15 above the layer of felt to prevent moisture running over the outside of the strip 12.

In Figure 7 there is shown a somewhat different form of threshold, wherein any admitted water is drained out through weephole 19 through the rear wall 20 and then out through weephole 21 in the center leg 22, and thence on out through weephole 10, as previously described. The layer of felt 11d is placed over the rear wall 20 and is held in place between the ledge 3 and a resilient clamping member 23 positioned over the bottom of the wall 20 and being provided with the flanges 24 and 25, the former of which engages the wall 20 of the threshold and the latter of which, through the resiliency of the clamping member 23, bites into the felt 11d and firmly holds it in place.

It will be seen from Figure 9 that the auxiliary strip 12 of Figure 6 is provided with the dovetail groove 18a adapted to slide over the dovetail tongue 18b formed in the projection 13 of the threshold.

It will also be seen in Figures 2 and 7 that the resilient strip 9 has its edge bent over as indicated at 26 to prevent cutting into the felt layer, the rounded edge thus presented to the layer simply compressing it instead of cutting into the felt layer and thereby tending to destroy it.

The clamping member 23 employed in the form of the threshold illustrated in Figure 7 is of spring metal, and is formed of suitable angular configuration, as will be apparent from Figures 7 and 8.

The strip 8 is of suitable non-corrosive metal, such as zinc and effectively prevents the water coming in contact with the floor 27 upon which the threshold is installed.

Having thus described my invention, what I claim as new and desire to secure by Letters Patent of the United States, is—

1. A threshold comprising a body portion comprising a tread member and a trough member, drainage means extending from the trough member through the body portion, and instrumentalities interposed in the drainage means for preventing entry of outside weather therethrough while allowing free drainage of moisture collected in the said trough member.

2. A threshold comprising a body portion, a tread member and a trough, the said body member being provided with drainage means leading from the trough through the body portion, and a strip of filter felt interposed in the drainage means for preventing entry of outside weather therethrough while allowing free drainage of moisture collected in the trough.

3. A threshold comprising a body portion, a tread member and a trough, the said body member being provided with drainage means leading from the trough through the body portion, and a strip of filter felt positioned in the trough and secured thereto over the drainage means to prevent passage of air through the drainage means while allowing free passage of moisture therethrough.

4. A threshold comprising a body including an elevated tread and a trough, the tread having a portion thereof defining a ledge projecting over the trough, there being drainage means for draining moisture collected in the trough from the trough through the body of a threshold, and means positioned in the trough for preventing passage of air through the drainage means while allowing free passage of moisture therethrough, the said last means extending over the drainage means and substantially filling the said trough to avoid possibility of tripping over the said ledge.

5. A threshold comprising a body including a tread member and a trough, the said tread member having a portion thereof formed into a ledge projecting over the said trough, drainage means extending through the said body, and a body of filter felt positioned in the trough and secured thereto and cooperating with the ledge to avoid possibility of tripping over the said ledge, the said felt preventing passage of air through the drainage means while allowing free drainage of moisture therethrough.

6. A threshold formed of a continuously integral parallel sided body having opposite downwardly sloping sides, and a middle elevated tread, a portion thereof being formed into an upstanding ledge having an edge portion extending laterally toward one of the said sides, such side adjacent to the edge portion having an outer surface sloping toward the edge portion and then rounded downwardly providing an open gap partially extending under the said edge portion, the open gap being provided with drainage apertures extending to the interior of the threshold, there being further drainage apertures extending through one of the sloping sides and communicating with the outside atmosphere, and filter means substantially filling the trough and extending over the drainage apertures therefrom to prevent passage of outside air through the threshold while allowing free drainage of moisture from the said trough.

7. A threshold comprising a body including a middle elevated tread and a supporting leg therefor, the body then extending rearwardly and having drainage apertures through the said leg and through the body portion to drain collected moisture from the exterior thereof, and an upstanding auxiliary strip secured to the rearwardly extending portion of the body and defining with the said leg and tread an open gap extending partially under the said tread, the said strip being provided with an overhanging shoulder, a body of filter felt positioned in the said open gap and extending over the apertures leading therefrom, the said filter felt obstructing passage of air through the threshold while allowing free drainage of water from the gap, the felt engaging the overhanging shoulder of the auxiliary strip and secured in position thereby.

8. A threshold formed of a parallel sided body having opposite downwardly sloping sides and a middle elevated tread portion, a portion thereof defining a ledge having an edge portion extending laterally toward one of the said sides, such side adjacent the edge portion having an outer surface sloping toward the edge portion and then rounded downwardly providing an open gap, weepholes extending through the body from the open gap and through the opposite side to drain moisture collected in the gap to the outside of the threshold, a felted filter medium positioned in the gap and extending over the sloping surface of the side adjacent the said edge portion and covering the weepholes therethrough to prevent passage of air through the threashold while allowing free drainage of moisture through the gap, and a resilient retaining member secured over the bottom of the said sloping surfaced side and filtering medium to secure the latter in position on the said side.

9. A threshold comprising a body having opposite downwardly sloping sides and including a middle elevated tread, a portion of which defines an upstanding ledge having an edge portion extending laterally toward one of the said sides, such side adjacent to the edge portion having an outer surface sloping toward the edge portion and then rounded downwardly providing an open gap, the gap being provided with weepholes extending through the body for drainage of moisture collecting from the said gap, a body of compressible filter material secured in position in the gap and extending over the weepholes to prevent passage of air through the threshold while allowing free drainage of moisture from the gap, the said threshold being installed beneath a door, a resilient strip secured to the door and adapted to interlock with the edge of the said ledge to seal substantially the space between the threshold and the door, the said resilient strip having its edge overturned to present a rounded surface engaging with the compressible material in the gap for preventing cutting of the said material upon operation of the door.

10. A one piece threshold formed of a continuously integral parallel sided body having opposite downwardly sloping sides and a middle elevated tread having an edge portion extending laterally toward one of the said sides, such side adjacent to the edge portion having an outer surface sloping toward the edge portion and then rounded downwardly providing an open gap, the open gap being provided with drainage apertures extending to the interior of the threshold, there being further drainage apertures extending through one of the sloping sides and communicating with the outside atmosphere, and means associated with the apertures for preventing ingress of the outside atmosphere through the door sill while allowing free drainage of collected moisture therethrough.

11. A threshold comprising a body portion having a tread member and a trough member, drainage means for leading moisture collected in the trough and beneath the threshold to the outside thereof, and a filtering member interposed in the drainage means for preventing entry of outside weather therethrough while allowing free drainage of moisture collected in the trough member and preventing dirt accumlated therein to be carried beneath the threshold.

12. A threshold comprising a body portion having a tread member and a trough member, drainage means for leading moisture collected in the trough and beneath the threshold to the outside thereof, and a layer of filter felt interposed in the drainage means for preventing entry of outside weather therethrough, while allowing free drainage of moisture collected in the trough member and preventing dirt accumulating therein to be carried beneath the threshold.

13. A threshold comprising a body portion including a tread and a trough member, drainage means for leading moisture collected in the trough and beneath the threshold to the outside thereof and a strip of filter felt interposed in the drainage means beneath the threshold, the filter strip being compressed upon installation of the threshold between the threshold and floor, the filter strip preventing passage beneath the threshold of dirt collected in the trough and weather passing through the threshold while allowing free drainage moisture through the threshold.

14. A weatherstrip comprising a body portion having drainage apertures therethrough, and an absorbent strip for the body portion extending across the apertures to prevent passage of air therethrough while allowing free drainage of collected moisture through the apertures.

15. A weatherstrip comprising a body portion having drainage apertures therethrough, and means extending across the apertures to prevent passage of air therethrough while allowing free drainage of collected moisture through the apertures.

In testimony whereof I affix my signature.

ELMER D. BARRINGER.